Oct. 26, 1965 D. G. WILSON 3,214,606

RETENTIVE MEMORY BISTABLE MULTIVIBRATOR CIRCUIT WITH PREFERRED STARTING MEANS

Filed Aug. 13, 1962

INVENTOR.

Douglas G. Wilson

BY Paul J. Ethington

ATTORNEY 3,214,606

RETENTIVE MEMORY BISTABLE MULTIVIBRATOR CIRCUIT WITH PREFERRED STARTING MEANS

Douglas G. Wilson, Kokomo, Ind., assignor to General Motors Corporation, Detroit, Mich., a corporation of Delaware Filed Aug. 13, 1962, Ser. No. 216,423
7 Claims. (Cl. 307—88.5)

This invention relates to multivibrator circuits and more particularly to an improved bistable multivibrator circuit including circuit means for returning the circuit to its last stable state after the voltage source has been interrupted and then reconnected.

One form of bistable multivibrator circuit known in the prior art comprises two electronic control devices which are cross coupled for bistable operation. When power is applied to the circuit one of the two devices will be conductive and the other will be cut off. The characteristics of the control devices determine which one will initially conduct and thus apply reverse bias to the other device through the cross coupling network. Input trigger signal voltages are applied to the devices for switching the stable state of the circuit. It is frequently desirable in applications utilizing bistable multivibrator circuits to provide means for returning the circuit to its last stable state after the voltage source has been removed and then returned. In addition, it may be desirable in such circuits to provide means for insuring that the initial stable state follows a set pattern each time the voltage source is initially applied to the circuit.

In accordance with this invention, a bistable multivibrator circuit is provided including circuit means for returning the circuit to its last stable state after the voltage source has been removed and then returned. This is accomplished with a multivibrator circuit including first and second electronic control devices connected for bistable operation. A starting circuit is connected with the input circuit of a selected one of the devices so as to cause the multivibrator circuit to be initially energized in a first stable state after interruption and reconnection of the voltage source. A memory circuit is provided for causing the multivibrator circuit to be switched to a second stable state upon reconnection of the voltage source only if it was in its second stable state when the voltage source was interrupted. The memory circuit includes memory means adapted to be energized in first and second conditions. First and second energizing means are connected with the voltage source and associated with the memory means for respectively energizing the memory means in the first and second conditions. Circuit means are connected between the second energizing means and the input circuit of the selected one of the devices and adapted to disable the second energizing means when the selected one of the devices is conductive whereby the memory means is energized in the first condition when the multivibrator circuit is in a first stable state and the memory means is energized in the second condition when the multivibrator circuit is in a second stable state. Circuit means are also provided connected between the first energizing means and the input circuit of the first device for providing forward biasing potential to the first device only when the memory means is energized in the second condition.

A more complete understanding of this invention may be had from the detailed description which follows taken with the accompanying drawing in which.

Figure 1:
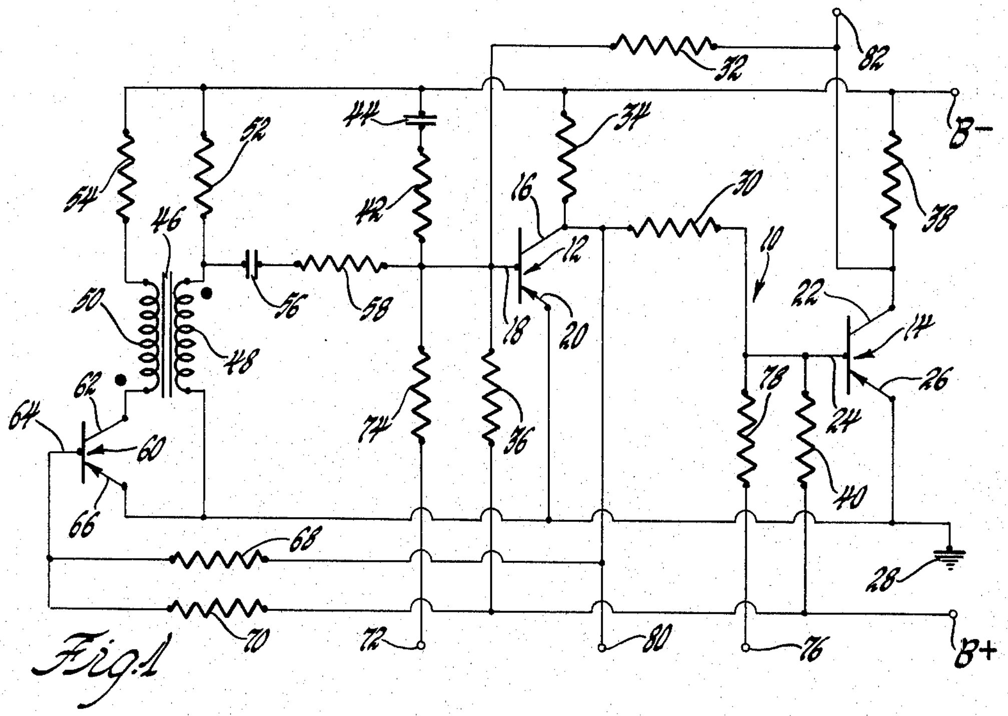
FIGURE 1 is a schematic circuit diagram of one embodiment of the invention.

Referring now to FIGURE 1 there is shown a multivibrator circuit 10 comprising two PNP transistors 12 and 14 connected for bistable operation. The transistor 12 comprises a collector 16, a base 18 and an emitter 20. The transistor 14 comprises a collector 22, a base 24 and an emitter 26. The emitters 20 and 26 are connected together in common with ground 28. The collector 16 of the transistor 12 is cross connected to the base 24 of the transistor 14 via a current limiting resistor 30. The collector 22 of the transistor 14 is cross connected to the base 18 of the transistor 12 via a current limiting resistor 32. The transistor 12 has its collector 16 connected to a B— voltage supply source via a collector bias resistor 34 and has its base 18 connected to a B+ voltage supply source via a base bias resistor 36. Similarly, the transistor 14 has its collector 22 connected to the B— voltage supply source via a collector bias resistor 38 and has its base 24 connected to the B+ voltage supply source via a base bias resistor 40. The potential of the B+ voltage supply source is approximately one-half that of the B— voltage supply source. A transient starting circuit including a current limiting resistor 42 and a capacitor 44 is connected between the base 18 of the transistor 12 and the B— voltage supply source.

A high remanence transformer core 46 capable of flux saturation and remanence is provided having a saturating winding 48 and a resetting winding 50 wound thereon. The windings 48 and 50 are oppositely wound with respect to each other as is shown by the dots in FIGURE 1. The upper terminals of the windings 48 and 50 are connected with the B— voltage supply source via current limiting resistors 52 and 54, respectively. The upper terminal of the winding 48 is also connected with the base 18 of the transistor 12 via a biasing circuit including a capacitor 56 and a current limiting resistor 58. The lower terminal of the winding 48 is connected with ground 28 so that current flowing from the B— source through the winding 48 is in a direction to saturate the core 46. A PNP type transistor 60 is provided comprising a collector 62, a base 64 and an emitter 66. The transistor 60 has its collector 62 connected with the lower terminal of the resetting winding 50 and its emitter 66 connected with ground 28 so that current flowing from the B— source through the winding 50 is in a direction to reset the core 46. The collector 16 of the transistor 12 is connected with the base 64 of the transistor 60 via a current limiting resistor 68 so as to control the conductivity of transistor 60. The base 64 of the transistor 60 is also connected with the B+ voltage supply source via a base bias resistor 70.

Input trigger signal voltages may be applied to the base 18 of the transistor 12 between ground 28 and an input terminal 72 via a current limiting resistor 74. Input trigger signal voltages may also be applied to the base 24 of the transistor 14 between ground 28 and an input terminal 76 via a current limiting resistor 78. Output signal voltages may be obtained from the transistor 12 between ground 28 and an output terminal 80 connected with the collector 16 of the transistor 12. Output signal voltages from the transistor 14 may be obtained between ground 28 and an output terminal 82 connected with the collector 22 of the transistor 14.

The circuit is preferably designed such that the resistance of the resistor 54 is less than that of the resistor 52. Thus, when the transistor 60 is forward biased the current flowing through the resetting winding 50 will be greater in magnitude than the current flowing through the saturating winding 48 whereby the net magnetomotive force existing across the windings 48 and 50 will be in a direction to reset the core 46.

When voltage from the B— and B+ voltage supply sources is initially applied to the multivibrator circuit 10 the potential existing on the collectors 16 and 22 will tend to increase in magnitude proportional to the B— voltage. This potential increase will be coupled to the bases 18 and 24 through the current limiting resistors 32 and 30, respectively. However, some current will flow from ground 28 from the emitter 20 to base 18 of the transistor 12, the resistor 42, the capacitor 44 to the B— voltage supply source so as to charge the capacitor 44. There will be a voltage drop due to the current flow through the diode comprising the emitter 20 and base 18 of transistor 12 and also due to the current flow across resistor 42. Since the emitter 20 of transistor 12 is maintained to the potential of ground 28, the potential at base 18 will be negative with respect thereto and transistor 12 will be biased toward the conducting state. Thus a potential will exist on the base 18 which is negative with respect to that existing on the emitter 20 so as to forward bias the transistor 12. This will permit a greater base drive current to the transistor 12 than to the transistor 14 and as a result the potential existing on the collector 16 of transistor 12 will be more positive than that on the collector 22 of the transistor 14. Since the transistors 12 and 14 are coupled together for bistable operation, the base drive of the transistor 14 will be further reduced due to degenerative feedback action. This action continues until the transistor 12 becomes fully conductive and the transistor 14 becomes fully cut-off. This is the initial stable state of the multivibrator circuit 10.

When the multivibrator circuit 10 is in its initial stable state as described above the transistor 60 will be rendered non-conductive. This is true because the base 64 of the transistor 60 is connected with the collector 16 of the transistor 12 and with the transistor 12 conducting the potential existing on its collector 16 will be nearly that of ground 28 and hence the transistor 60 will be maintained reverse biased by the B+ voltage supply source connected with its base 64. Current will flow from ground 28 through the saturating winding 48 in a direction to saturate the core 46 and through the resistor 52 to the B— voltage supply source. Some current will also flow from ground 28 from the emitter 20 to base 18 of the transistor 12, the resistor 58, the capacitor 56 so as to charge capacitor 56, and the resistor 52 to the B— voltage supply source. If an input trigger signal voltage of negative polarity and of sufficient magnitude is now applied between ground 28 and the input terminal 76, the transistor 14 will become forward biased. The potential existing on the collector 22 of the transistor 14 will become more positive approaching that of ground 28. Since the transistors 12 and 14 are coupled together for bistable operation the base drive current to the transistor 12 will decrease as the potential on the collector 22 approaches that of ground 28. This action will continue until the transistor 14 becomes fully conductive and the transistor 12 becomes fully cut off. The potential existing on collector 16 of the transistor 12 will now approch that of the B— voltage supply source and since the collector 16 is connected with the base 64 of the transistor 60 the transistor 60 will be rendered forward biased. Current will flow from ground 28, emitter 66 to collector 62 of the transistor 60, the resetting winding 50 in a direction to reset the core 46 and the resistor 54 to the B— voltage supply source. But, since the resistance of the resistor 54 is less than that of the resistor 52, the net magnetomotive force existing across the windings 48 and 50 will be in a direction to reset the core 46. If the B— and B+ voltage supply sources are removed from the circuit the core 46 will remain in the last state excited and the capacitor 44 will discharge through the path including the resistor 38, the resistor 32, and the resistor 42.

If the last stable state of the multivibrator circuit 10 was that the transistor 12 was conductive and that the transistor 14 was non-conductive and the core 46 was saturated, then upon removal and return of the B— and B+ voltage supply sources current will flow from ground 28, the emitter 20 to base 18 of the transistor 12, the resistor 42 and the capacitor 44 to the B— voltage supply source so as to charge capacitor 44. Thus the potential existing on the base 18 will be negative with respect to that on emitter 20 so as to forward bias the transistor 12. Current will also flow from ground 28 through the saturating winding 48, which will present negligible reactance since the core 46 is saturated, and through the resistor 52 to the B— voltage supply source. With the transistor 12 conductive the transistor 14 will be rendered non-conductive due to bistable operation.

If the last stable state of the multivibrator circuit 10 was that the transistor 12 was non-conductive and the transistor 14 was conductive and the core 46 was in a reset condition, then upon removal and return of the B— and B+ voltage supply sources current will flow from ground 28 through the saturating winding 48, which will be excited and a voltage drop will appear thereacross, and the resistor 52 to the B— voltage supply source. Current will also flow from the emitter 20 to base 18 of the transistor 12, through the path including the resistor 42 and the capacitor 44 and through the path including the resistor 58, the capacitor 56 and the resistor 52 to the B— voltage supply source so as to charge capacitors 44 and 56. The potential existing on the base 18 of the transistor 12 will thus become negative with respect to that on the emitter 20 so as to forward bias the transistor 12. With the transistor 12 conductive, the transistor 14 will be rendered non-conductive due to bistable operation. When the core 46 becomes saturated due to the current flowing through the saturating winding 48, the potential existing on the upper terminal of the winding 48 will become nearly that of ground 28 and the capacitor 56 will discharge through the path including the resistor 58, the resistor 32, the resistor 38 and the resistor 52 and in so doing will apply positive potential corresponding to the transient current of capacitor 56 to the base 18 of transistor 12 so as to reverse bias the transistor 12. The capacitor 56 will also discharge through the path including the resistor 58, the base 18 to emitter 20 junction of the transistor 12, and through the winding 48 to oppose the existing negative base current of the transistor 12. With the transistor 12 non-conductive, the transistor 14 will be rendered conductive due to bistable operation.

Figure 2:
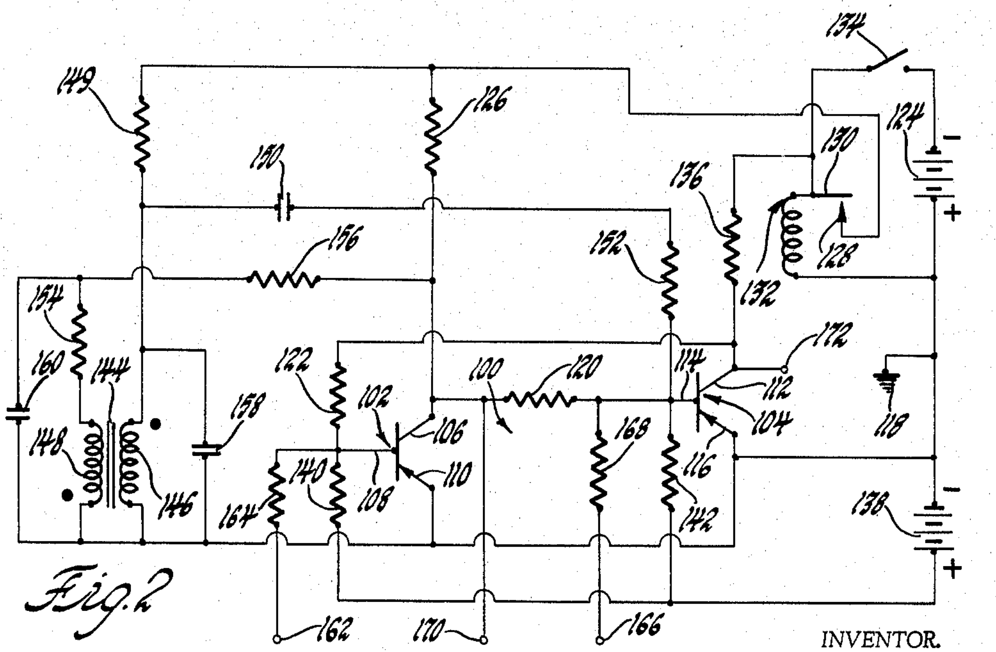
FIGURE 2 is a schematic circuit diagram of another embodiment of the invention.

Referring now to FIGURE 2 there is shown a second embodiment of the invention comprising a multivibrator circuit 100 including two PNP transistors 102 and 104 connected together for bistable operation. The transistor 102 comprises a collector 106, a base 108 and an emitter 110. The transistor 104 comprises a collector 112, a base 114 and an emitter 116. The emitters 110 and 116 are connected together in common with ground 118. The collector 106 of the transistor 102 is cross connected to the base 114 of the transistor 104 via a current limiting resistor 120. The collector 112 of the transistor 104 is cross connected to the base 108 of the transistor 102 via a current limiting resistor 122. The collector 106 of the transistor 102 is connected with the negative terminal of a voltage source 124 via a collector bias resistor 126, a stationary contact 128 and a movable contact 130 of a time delay relay 132 and an off-on switch 134. The collector 112 of the transistor 104 is connected with the negative terminal of the voltage supply source 124 via a collector bias resistor 136 and the on-off switch 134. The base 108 of the transistor 102 and the base 114 of the transistor 104 are connected with the positive terminal of a voltage supply source 138.

A high remanence transformer core 144 capable of flux saturation and remanence is provided having wound thereon a saturating winding 146 and a resetting winding 148. The windings 146 and 148 are oppositely wound with respect to each other as shown by the dots in FIGURE 2.

The lower terminals of the windings 146 and 148 are connected together in common with ground 118. The upper terminal of the saturating winding 146 is connected with the negative terminal of the voltage supply source 124 via a current limiting resistor 149, the contacts 128 and 130 of the relay 132 and the on-off switch 134. The upper terminal of the saturating winding 146 is also connected with the base 114 of the transistor 104 via a biasing circuit including a capacitor 150 and a current limiting resistor 152. The upper terminal of the resetting winding 148 is connected with the collector 106 of the transistor 102 via current limiting resistors 154 and 156. A capacitor 158 is connected across the saturating winding 146 and a capacitor 160 is connected between the lower terminal of the resetting winding 148 and the junction of the resistors 154 and 156.

The circuit is preferably designed such that the resistance of resistors 154, 156 and 126 is less than that of the resistor 149. Thus, when current flows through both the windings 146 and 148, the net magnetomotive force existing across the windings will be in a direction to reset the core 144. The capacitors 158 and 160 serve to delay current flow through the windings 146 and 148, respectively, until the respective capacitors are fully charged. This is to prevent cross coupling through the core 144 which may create instability in the operation of the multivibrator circuit 100.

Input trigger signal voltages may be applied to the base 108 of the transistor 102 between ground 118 and an input terminal 162 via a current limiting resistor 164. Input trigger signal voltages may also be applied to the base 114 of the transistor 104 between ground 118 and an input terminal 166 via a current limiting resistor 168. Output signal voltages from the transistor 102 may be obtained between ground 118 and an output terminal 170 connected with the collector 106 of the transistor 102. Similarly, output signal voltages from the transistor 104 may be obtained between ground 118 and an output terminal 172 connected with the collector 112 of the transistor 104.

Upon closure of the switch 134 the negative terminal of the voltage source 124 will be connected with the collector 112 of the transistor 104 via the collector bias resistor 136. The negative terminal of the source 124 will also be connected with the base 108 of the transistor 102 via the resistor 122. The potential existing on the collector 112 of the transistor 104 and on the base 108 of the transistor 102 will tend to increase in magnitude proportional to that of the source 124. The transistor 104 will be reverse biased since its base 114 is connected with the positive terminal of the source 138 via a base bias resistor 142 rendering the potential on the base 114 positive with respect to that on the emitter 116. The transistor 102 will be forward biased since the potential existing on its base 108 is negative with respect to that on its emitter 110. This is true because the magnitude of the positive potential existing on the base 108 due to the voltage source 138 is less than the negative potential existing on the base 108 due to the voltage source 124. Upon closure of the contacts 130 and 128 of the time delay relay 132, negative potential will be applied to the collector 106 of the transistor 102 from the negative terminal of the source 124 via the collector bias resistor 126. Thus, the transistor 102 will become conductive whereby the potential existing on its collector 106 will approach that of ground 118. Since the collector 106 of the transistor 102 is cross connected to the base 114 of the transistor 104 via the resistor 120, the transistor 104 will become non-conductive due to bistable operation. This is the initial stable state of the multivibrator circuit 100.

With the transistor 102 fully conductive and the transistor 104 fully cut off, the potential existing on the collector 106 of the transistor 102 will be essentially that of ground 118 and thereby short circuiting the resetting winding 148. Hence negligible voltage drop will appear across the resetting winding 148 and negligible current will flow therethrough. However, current will flow from the positive terminal of the source 124 from the lower to upper terminal of the saturating winding 146 in a direction to saturate the core 144 and through the current limiting resistor 149 to the negative terminal of the source 124. If an input trigger signal voltage of negative polarity and of suffiicent magnitude is now applied between ground 118 and the input terminal 166, the potential existing on the base 114 of the transistor 104 will become negative with respect to that existing on the emitter 116 and the transistor 104 will become forward biased. With the transistor 104 forward biased the transistor 102 will be rendered reverse biased due to bistable operation. When the transistor 104 becomes fully conductive and the transistor 102 fully cut off, a negative potential will exist on the collector 106 of the transistor 102 approaching that of the voltage source 124. After a short time delay during which the capacitor 160 becomes charged to a potential approaching that of the source 124 a potential will exist across the lower and upper terminals of the resetting winding 148 permitting current flow therethrough. Current will continue to flow from the positive terminal of the source 124 from the lower to upper terminal of the saturating winding 146 in a direction tending to saturate the core 144 and through the current limiting resistor 149 to the negative terminal of the source 124. Current will also flow from the positive terminal of the source 124 from the lower to upper terminal of the resetting winding 148 in a direction to reset the core 144, the resistor 154, the resistor 156 and the resistor 126 to the negative terminal of the source 124. Since the resistance of the resistors 154, 156 and 126 is less than that of the resistor 149 the current flowing through the resetting winding 148 will be of greater magnitude than that flowing through the saturating winding 146. Thus the net magnetomotive force exisiting across the windings 146 and 148 will be in a direction to render the core 144 in a reset condition. If the voltage supply sources 124 and 138 are removed from the circuit the core 144 will remain in the last state excited.

If the last stable state of the multivibrator circuit 100 was that the transistor 104 was conductive and the transistor 102 was non-conductive and the core 144 was reset, then upon removal and return of the voltage supply sources 124 and 138 the multivibrator circuit 100 will be in its initial stable state as described hereinbefore, i.e., that the transistor 102 will be conductive and that transistor 104 will be non-conductive. Current will flow from the positive terminal of the source 124 from the lower to upper terminal of the saturating winding 146 and the current limiting resistor 149 to the negative terminal of the source 124. However, since the core 144 was in a reset condition, the winding 146 will be excited and a voltage drop will appear thereacross. This will permit curren to flow from the emitter 116 to base 114 of the transistor 104, the current limiting resistor 152, the capacitor 150 and the current limiting resistor 149 to the negative terminal of the source 124 so as to charge capacitor 150. Thus the transistor 104 will become forward biased and the potential existing on its collector 112 will become more positive approaching that existing on its emitter 116. With the transistor 104 forward biased the transistor 102 will be rendered reverse biased due to bistable operation. The potential existing on the collector 106 of the transistor 102 will become negative approaching that of the source 124. The capacitor 160 will charge in accordance with the potential existing on the collector 106 of the transistor 102 and when fully charged a potential difference will exist between the lower and upper terminal of the resetting winding 148 permitting current flow therethrough. Current will flow from the positive terminal of the source 124 from the lower to upper terminal of the saturating winding 146 in a direction to saturate the core 144 and through the current limiting resistor 149 to the negative terminal of the source 124. Current will also flow from the positive terminal of the source 124 from the lower to upper terminal of the resetting winding 148 in a direction to reset the core 124, through the current limiting resistors 154 and 156 and the collector bias resistor 126 to the negative terminal of the source 124. Since the resistance of the resistors 154, 156 and 126 is less than that of the resistor 149 the current flowing through the resetting winding 148 will be greater in magnitude than that flowing through the saturating winding 146 whereby the net magnetomotive force existing across the windings 146 and 148 will be in a direction to render the core in a reset condition.

If the last stable state of the multivibrator circuit 100 was that the transistor 102 was conductive and the transistor 104 was non-conductive and the core 144 was saturated, then upon removal and return of the voltage supply sources 124 and 138 the multivibrator circuit 100 will return to its initial stable state as descirbed hereinbefore, i.e., the transistor 102 will be conductive and the transistor 104 will be non-conductive. Current will flow from the positive terminal of the source 124 from the lower to upper terminal of the saturating winding 146 and the current limiting resistor 149 to the negative terminal of the source 124. Since the core 144 was in a saturated condition prior to removal of the sources 124 and 138, the saturating winding 146 will present negligible reactance and the voltage drop thereacross will be negligible. Hence no current will flow from the emitter 116 to base 114 of the transistor 104 and the transistor 104 will remain reverse biased.

Although the description of this invention has been given with respect to two embodiments, it is not to be construed in a limiting sense. Numerous variations and modifications within the spirit and scope of the invention will now occur to those skilled in the art. For a definition of the invention, reference is made to the appended claims.

I claim:

1. In combination with a bistable multivibrator circuit including first and second electronic control devices having respective input and output circuits, a voltage source connected with the output circuits, the input circuit of each device being coupled with the output circuit of the other device whereby the multivibrator circuit has two stable states with one device non-conductive when the other device is conductive, the input circuits being adapted to receive input signals for switching the multivibrator circuit from one stable state to the other, a starting circuit connected with the input circuit of a selected one of the devices to cause the multivibrator circuit to be initially energized in a first stable state after interruption and reconnection of the voltage source, a memory circuit for causing the multivibrator circuit to be switched to a second stable state upon reconnection of the voltage source only if it was in its second stable state when the voltage source was interrupted, the memory circuit comprising memory means adapted to be energized in first and second conditions, first and second energizing circuits associated with the memory means for respectively energizing the memory means in the first and second conditions, the first and second energizing circuits being connected with the voltage source, the impedance of the first energizing circuit being greater than that of the second energizing circuit, first circuit means connected between the second energizing circuit and the input circuit of the selected one of the devices for disabling the second energizing circuit when the selected one of the devices is conductive whereby the memory means is energized in the first condition when the multivibrator circuit is in a first stable state and the memory means is energized in the second condition when the multivibrator circuit is in a second stable state, and second circuit means connecting the first energizing circuit means with the input circuit of the first device for providing forward biasing potential to the first device only when the memory means is energized in the second condition.

2. In combination with a bistable multivibrator circuit including first and second electronic control devices having respective input and output circuits, a voltage source connected with the output circuits, the input circuit of each device being coupled with the output circuit of the other device whereby the multivibrator circuit has two stable states with one device non-conductive when the other device is conductive, the input circuits being adapted to receive input signals for switching the multivibrator circuit from one stable state to the other, a starting circuit connected with the input circuit of a selected one of the devices to cause the multivibrator circuit to be initially energized in a first stable state after interruption and reconnection of the voltage source, a memory circuit for causing the multivibrator circuit to be switched to a second stable state upon reconnection of the voltage source only if it was in its second stable state when the voltage source was interrupted, the memory circuit comprising a saturable core, a saturating winding circuit and a resetting winding circuit linking the core, the saturating winding and resetting winding being connected across the voltage source, first circuit means connected between the resetting winding and the input circuit of the selected one of the devices and adapted to disable the resetting winding when the selected one of the devices is conductive whereby the core is saturated when the multivibrator circuit is in a first stable state and the core is reset when the multivibrator circuit is in a second stable state, and second circuit means connecting the saturating winding with the input circuit of the first device for providing forward biasing potential to the first device only when the core is in its reset condition.

3. In combination with a multivibrator circuit including first and second transistors, each transistor including an emitter, a base and a collector, a voltage source connected between the emitter and collector of each transistor, the emitters being connected in common, the collector of each transistor connected to the base of the other transistor whereby the multivibrator circuit has two stable states with one transistor non-conductive when the other transistor is conductive, input circuit means connected with the base of each transistor for selectively applying input trigger signal voltages thereto so as to control the conductive state of the transistors, a starting circuit connected with the base of a selected one of the transistors to cause the multivibrator circuit to be initially energized in a first stable state after interruption and reconnection of the voltage source, a memory circuit for causing the multivibrator circuit to be switched to a second stable state upon reconnection of the voltage source only if it was in its second stable state when the voltage source was interrupted, the memory circuit comprising a high remanence transformer core capable of flux saturation and remanence, a saturating winding and a resetting winding mounted on the core, the resetting winding and saturating winding being connected across the voltage source, circuit means connected between the resetting winding and the base of the selected one of the transistors and adapted to disable the resetting winding when the selected one of the transistors is conductive whereby the core is saturated when the multivibrator circuit is in a first stable state and the core is reset when the multivibrator circuit is in a second stable state, and a transient switching circuit including a capacitor connected in parallel with the saturating winding across the voltage source whereby a transient current charges the capacitor when the core is in its reset condition, the switching circuit being connected with the base of the first transistor for applying thereto a voltage corresponding to the transient current of the capacitor when the core becomes saturated whereby the multivibrator circuit is switched from the first stable state to the second stable state.

4. In combination with a bistable multivibrator circuit including first and second transistors, each transistor including a base, a collector and an emitter, a voltage source connected between the emitter and collector of each transistor, the emitters being connected in common, the collector of each transistor connected with the base of the other transistor whereby the multivibrator circuit has two stable states with one transistor non-conductive when the other transistor is conductive, input circuit means connected with the base of each transistor for selectively applying input trigger signal voltages thereto so as to control the conductive state of the transistors, a starting circuit connected with the base of a selected one of the transistors to cause the multivibrator circuit to be initially energized in a first stable state after interruption and reconnection of the voltage source, a memory circuit for causing the multivibrator circuit to be switched to a second stable state upon reconnection of the voltage source only if it was in its second state when the voltage source was interrupted, the memory circuit comprising a high remanence transformer core capable of flux saturation and remanence, a saturating winding and a resetting winding mounted on the core, the saturating winding being conected across the source so that current flowing therefrom through the saturating winding is in a direction tending to saturate the core, a third transistor having a base, an emitter and a collector, the resetting winding being connected across the source via the emitter to collector of the third transistor so that current flowing from the source through the resetting winding is in a direction tending to reset the core, circuit means connecting the base of the third transistor with the collector of the first transistor and adapted to disable the resetting winding when the first transistor is conductive whereby the core is saturated when the multivibrator circuit is in its first stable state and the core is reset when the multivibrator circuit is in its second stable state, and a transient switching circuit including a capacitor connected in parallel with the saturating winding across the voltage source whereby a transient current charges the capacitor when the core is in its reset condition, the switching circuit being connected with the input circuit of one of the devices for applying thereto a voltage corresponding to the transient current of the capacitor when the core becomes saturated whereby the multivibrator circuit is switched from the first stable state to the second stable state.

5. In combination with a bistable multivibrator circuit including first and second transistors, each transitor including a base, a collector and an emitter, a voltage source connected between the emitter and collector of each transistor, the emitters being connected in common, the collector of each transistor connected with the base of the other transistor whereby the multivibrator circuit has two stable states with one transistor non-conductive when the other transistor is conducitve, input circuit means connected with the base of each transistor for selectively applying input trigger signal voltages thereto so as to control the conductive state of the transistors, a starting circuit connected with the base of a selected one of the transistors to cause the multivibator circuit to be initially energized in a first stable state after interruption and reconnection of the voltage source, a memory circuit for causing the multivibrator circuit to be switched to a second stable state upon reconnection of the voltage source only if it was in its second stable state when the voltage source was interrupted, the memory circuit comprising a high remanence transformer core capable of flux saturation and remanence, a saturating winding and a resetting winding mounted on the core, the saturating winding being connected in a first circuit across the source so that current flowing therefrom through the saturating winding is in a direction tending to saturate the core, a third transistor including a base, an emitter and a collector, the resetting winding being connected in a second circuit across the source via the emitter to collector of the third transistor so that the current flowing from the source through the resetting winding is in a direction tending to reset the core, the impedance of the second circuit being less than that of the first circuit whereby when current flows from the source through both the resetting winding and the saturating winding the magnitude of current flowing through the former will be greater than that flowing through the latter so as to reset the core, circuit means connecting the base of the third transistor with the collector of the first transistor and adapted to disable the resetting winding when the first transistor is conductive whereby the core is saturated when the multivibrator circuit is in its first stable state and the core is reset when the multivibrator circuit is in its second stable state, and a transient switching circuit including a capacitor connected in parallel with the saturating winding across the voltage source whereby a transient current charges the capacitor when the core is in its reset condition, the switching circuit being connected with the base of one of the transistors for applying thereto a voltage corresponding to the transient current of the capacitor when the core becomes saturated whereby the multivibrator circuit is switched from the first stable state to the second stable state.

6. In combination with a bistable multivibrator circuit including first and second transistors, each transistor including a base, a collector and an emitter, a voltage source connected between the emitter and collector of the second transistor, the emitters being connected in common, the collector of each transistor connected with the base of the other transistor whereby the multivibrator circuit has two stable states with one transistor nonconductive when the other transistor is conductive, input circuit means connected with the base of each transistor for selectively applying input trigger signal voltages thereto so as to control the conductive state of the transistors, a starting circuit connecting the source with the collector of the first transistor to cause the multivibrator circuit to be initially energized in a first stable state after interruption and reconnection of the voltage source, a memory circuit for causing the multivibrator circuit to be switched to a second stable state upon reconnection of the voltage source only if it was in its second stable state when the voltage source was interrupted, the memory circuit comprising a high remanence transformer core capable of flux saturation and remanence, a saturating winding and a resetting winding mounted on the core, the resetting winding being connected across the source so that current flowing therefrom through the winding is in a direction tending to reset the core, the saturating winding being connected across the source so that current flowing therefrom through the saturating winding is in a direction tending to saturate the core, circuit means connecting the resetting winding across the emitter to collector of the first transistor and adapted to disable the resetting winding when the first transistor is conductive whereby the core is saturated when the multivibrator circuit is in a first stable state and the core is reset when the multivibrator circuit is in a second stable state, and circuit means connecting the saturating winding with the base of the second transistor whereby the second transistor will be conductive only when the core is in a reset condition.

7. In combination with a bistable multivibrator circuit including first and second transistors, each transistor comprising a base, an emitter and a collector, a voltage source connected between the emitter and collector of the second transistor, the emitters being connected in common, the collector of one transistor being connected with the base of the other transistor whereby the multivibrator circuit has two stable states with one transistor nonconductive when the other transistor is conductive, input circuit means connected with the base of each transistor for selectively applying input trigger signal voltages thereto so as to control the conductive state of the transistors, a starting circuit connecting the source with the collector of the first transistor to cause the multivibrator circuit to be initially energized in a first stable state after interruption and reconnection of the voltage source, a memory circuit for causing the multivibrator circuit to be switched to a second stable state upon reconnection of the voltage source only if it was in its second stable state when the voltage source is interrupted, the memory circuit comprising a high remanence transformer core capable of flux saturation and remanence, a saturating winding and a resetting winding mounted on the core, the resetting winding being connected in a first circuit across the source so that current flowing therefrom through the resetting winding is in a direction tending to reset the core, the saturating winding being connected in a second circuit across the source so that current flowing therefrom through the saturating winding is in a direction tending to saturate the core, the impedance of the first circuit being less than that of the second circuit whereby when current flows from the source through both the resetting winding and the saturating winding the magnitude of current flowing through the former will be greater than that through the latter so as to reset the core, circuit means connecting the resetting winding across the emitter to collector of the first transistor and adapted to short circuit the resetting winding when the first transistor is conductive whereby the core is saturated when the multivibrator circuit is in a first stable state and the core is reset when the multivibrator circuit is in a second stable state, and a transient circuit including a capacitor connected in parallel with the saturating winding across the voltage source whereby a transient current charges the capacitor when the core is in its reset condition, the transient circuit being connected with the base of the second transistor for applying thereto forward biasing potential as the capacitor charges so as to switch the multivibrator circuit from the first stable state to the second stable state.

References Cited by the Examiner

UNITED STATES PATENTS

| | | | |
|---|---|---|---|
| 2,903,607 | 9/59 | Danner et al. | 307—88.5 |
| 3,036,221 | 5/62 | Kleinschmidt | 307—88.5 |
| 3,151,255 | 9/64 | Jalpin | 307—88.5 |

FOREIGN PATENTS

| | | |
|---|---|---|
| 640,988 | 5/62 | Canada. |

ARTHUR GAUSS, *Primary Examiner.*